(12) United States Patent
Park et al.

(10) Patent No.: US 9,710,118 B2
(45) Date of Patent: Jul. 18, 2017

(54) SEMICONDUCTOR DEVICE AND SEMICONDUCTOR SYSTEM FOR PRODUCING NOISE DIFFERENCES BETWEEN POINTS OF TIME

(71) Applicant: SAMSUNG ELECTRONICS CO., LTD., Suwon-si, Gyeonggi-Do (KR)

(72) Inventors: Junchul Park, Daegu (KR); Bumsoo Kim, Seoul (KR); Hyunkyu Ouh, Yongin-si (KR); Sang-Hyub Kang, Yongin-si (KR); Chadong Kim, Gwacheon-si (KR); Sanho Byun, Bucheon-si (KR); Jinchul Lee, Seoul (KR); Yoon-Kyung Choi, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 67 days.

(21) Appl. No.: 14/750,079

(22) Filed: Jun. 25, 2015

(65) Prior Publication Data

US 2016/0070381 A1 Mar. 10, 2016

Related U.S. Application Data

(60) Provisional application No. 62/045,830, filed on Sep. 4, 2014.

(30) Foreign Application Priority Data

Nov. 14, 2014 (KR) ........................ 10-2014-0158655

(51) Int. Cl.
*H03L 5/00* (2006.01)
*G06F 3/044* (2006.01)
*G06F 3/041* (2006.01)

(52) U.S. Cl.
CPC ............ *G06F 3/044* (2013.01); *G06F 3/0416* (2013.01); *G06F 3/0418* (2013.01)

(58) Field of Classification Search
CPC ............ H03K 5/02; H03K 5/24; H03K 5/007; H03K 5/08; H03K 5/1252; G02F 2203/48;
(Continued)

(56) References Cited

U.S. PATENT DOCUMENTS 7,583,088 B2 9/2009 Mijuskovic et al.
7,948,244 B2 5/2011 Mijuskovic et al.
(Continued)

FOREIGN PATENT DOCUMENTS

JP 2010-517042 5/2010
JP 2012-098929 5/2012
(Continued)

*Primary Examiner* — Lincoln Donovan
*Assistant Examiner* — Diana J Cheng
(74) *Attorney, Agent, or Firm* — Volentine & Whitt, PLLC

(57) ABSTRACT

Provided are a semiconductor device and a semiconductor system, which can increase immunity against noises through tertiary correlated double sampling (CDS). The semiconductor device includes an amplifier that receives noise and a driving signal, resets for each predetermined period of the driving signal and samples the noise to generate first sampled noise. The first sampled noise includes multiple noise differences each occurring between consecutive reset points. A sampler performs second sampling and third sampling on the first sampled noise and performs fourth sampling on the second and third sampled noises. The first sampled noise includes first to third noise differences, the second sampled noise is a difference between the first and second noise differences, the third sampled noise is a difference between the second and third noise differences, and the fourth sampled noise is a difference between the second and third sampled noises.

20 Claims, 15 Drawing Sheets

(58) Field of Classification Search
CPC ........... H03H 17/0294; H03H 2210/02; H03H 2220/08; H03M 2201/64; H03F 3/45596
USPC .................................................. 327/306–310
See application file for complete search history.

(56) References Cited

U.S. PATENT DOCUMENTS

| | | |
|---|---|---|
| 8,274,491 B2 | 9/2012 | Souchkov |
| 8,497,746 B2 * | 7/2013 | Visconti ............... H03H 11/126 327/337 |
| 8,766,944 B2 | 7/2014 | Ksondzyk |
| 2011/0001492 A1 | 1/2011 | Nys et al. |
| 2011/0242048 A1 | 10/2011 | Guedon et al. |
| 2013/0249825 A1 | 9/2013 | Kang et al. |
| 2013/0257786 A1 | 10/2013 | Brown et al. |
| 2014/0240278 A1 | 8/2014 | Kim et al. |

FOREIGN PATENT DOCUMENTS

| | | |
|---|---|---|
| JP | 5563722 | 6/2014 |
| KR | 101209112 B1 | 12/2012 |
| KR | 1297595 | 8/2013 |
| KR | 1318447 | 10/2013 |
| WO | WO2008091730 A1 | 7/2008 |
| WO | WO2012034714 A1 | 3/2012 |

\* cited by examiner

1400

SEMICONDUCTOR DEVICE AND SEMICONDUCTOR SYSTEM FOR PRODUCING NOISE DIFFERENCES BETWEEN POINTS OF TIME

CROSS-REFERENCE TO RELATED APPLICATION

This application claims priority from Provisional Application No. 62/045,830 filed on Sep. 4, 2014 and from Korean Patent Application No. 10-2014-0158655 filed on Nov. 14, 2014 in the Korean Intellectual Property Office, and all the benefits accruing therefrom under 35 U.S.C. 119, the contents of which in their entirety are herein incorporated by reference.

BACKGROUND

1. Field of the Application

The application relates to a semiconductor device and a semiconductor system.

2. Description of the Related Art

In a capacitive touch controller, a read-out circuit senses that capacitance of a panel connected thereto (e.g., a touch panel) is changed by a human hand or a conductor. The read-out circuit may be affected by noise of external environments. Therefore, increasing immunity against noise is quite an important factor in sensing a change in the capacitance.

SUMMARY

The application discloses a semiconductor device, which can increase immunity against noises through tertiary correlated double sampling (CDS).

The application also discloses a semiconductor system, which can increase immunity against noises through tertiary correlated double sampling (CDS).

These and other objects of the application will be described in or be apparent from the following description of the preferred embodiments.

According to an aspect of the application, there is provided a semiconductor device having an amplifier that receives noise and a driving signal, resets for each predetermined period of the driving signal, and samples the noise to generate first sampled noise. The first sampled noise includes multiple noise differences each occurring between consecutive reset points. A sampler performs second sampling and third sampling on the first sampled noise and performs fourth sampling on the second and third sampled noises. The first sampled noise includes first to third noise differences, the second sampled noise is a difference between the first and second noise differences, the third sampled noise is a difference between the second and third noise differences, and the fourth sampled noise is a difference between the second and third sampled noises.

The amplifier includes a first operating amplifier; a first resistor connected between an input terminal and an output terminal of the first operating amplifier; a first capacitor connected in electrical parallel with the first resistor; and a first reset switch connected in electrical parallel with the first capacitor.

The noise is high-pass filtered through the first resistor and the first capacitor.

The predetermined period of the driving signal is half a cycle of the driving signal.

The semiconductor device further includes an offset canceller that receives the driving signal and cancels an offset of the driving signal.

The amplifier receives the noise, and the offset-cancelled driving signal.

The sampler includes a first sub-sampler that performs the second sampling. A second sub-sampler performs the third sampling, and a third sub-sampler performs the fourth sampling.

The first sub-sampler includes a second capacitor connected to the amplifier; a first switch that is connected to the second capacitor and receives a common-mode voltage; a second switch connected between the second capacitor and the third sub-sampler; a first integrator connected between the second switch and the third sub-sampler; and a second reset switch connected in electrical parallel with the first integrator.

The second sub-sampler includes a third capacitor connected to the amplifier; a third switch that is connected to the third capacitor and receives a common-mode voltage; a fourth switch connected between the third capacitor and the third sub-sampler; a second integrator connected between the fourth switch and the third sub-sampler; and a third reset switch connected in electrical parallel with the second integrator.

The third sub-sampler receives outputs of the first and second integrators and performs a subtracting operation.

The first switch and the fourth switch are simultaneously turned on or turned off.

The amplifier includes a first operating amplifier that receives a common-mode voltage. The sampler comprises a first sub-sampler that performs the second sampling, a second sub-sampler that performs the third sampling, and a third sub-sampler that performs the fourth sampling. The first sub-sampler includes a second capacitor connected to the amplifier, a second switch connected between the second capacitor and the third sub-sampler, and a first integrator connected between the second switch and the third sub-sampler.

According to another aspect of the application, there is provided a semiconductor device having an offset canceller that receives noise and a driving signal and cancels an offset of the driving signal. A correlated double-sampling (CDS) unit reduces the noise through sampling. A sample-and-hold amplifier receives an output of the CDS unit and performs buffering and low-pass filtering. The CDS unit resets for each predetermined period of the offset-cancelled driving signal, samples the noise to generate first sampled noise, performs second sampling and third sampling on the first sampled noise, and supplies the second and third sampled noises to the sample-and-hold amplifier. The first sampled noise includes a noise difference between two consecutive reset points and includes first to third noise differences, the second sampled noise is a difference between the first and second noise differences, and the third sampled noise is a difference between the second and third noise differences.

The sample-and-hold amplifier performs buffering and low-pass filtering on the second and third sampled noises.

The semiconductor device further includes an analog-digital converter (ADC) that performs fourth sampling of the buffered and low-pass-filtered second and third sampled noises. The fourth sampled noise is a difference between the second and third sampled noises.

According to another aspect of the application, there is provided a semiconductor device having a first sampler that samples received noise at four consecutive points in time to generate sampled noise. The points in time are t0, t1, t2, and t3 and occur in the sequence t0, t1, t2, and t3. A second sampler samples the sampled noise to generate a first signal indicating the difference in the amount of noise existing in the sampled noise between time points t1 and t0, generates a second signal indicating the difference in the amount of noise existing in the sampled noise between time points t2 and t1, and generates a third signal indicating the difference in the amount of noise between the second signal and the first signal. A third sampler samples the sampled noise to generate a fourth signal indicating the difference in the amount of noise existing in the sampled noise between time points t2 and t0, generates a fifth signal indicating the difference in the amount of noise existing in the sampled noise between time points t3 and t2, and generates a sixth signal indicating the difference in the amount of noise between the fifth signal and the fourth signal. A summer generates a difference in the amount of noise indicated by the third and sixth signals.

The first sampler further receives a cyclic driving signal and a common mode voltage signal and generates a first driving signal that is proportional to a difference between the driving signal and the common mode signal except during cyclic reset operations in which the common mode signal is output as the first driving signal. The cyclic reset operation has a cyclic period that is less than that of the cyclic driving signal, and a different one of the cyclic reset operations begins at each of the time points t0, t1, t2, and t3.

The second sampler receives the first driving signal, amplifies the first driving signal, and generates a second driving signal whose magnitude increases in proportion to the difference between the first driving signal and the common mode signal at each of the beginnings of the time points t0 and t2 and at each of the completions of the reset operations begun at the time points t0 and t2.

The third sampler receives the first driving signal, amplifies the first driving signal, and generates a third driving signal whose magnitude increases in proportion to the difference between the first driving signal and the common mode signal at each of the beginnings of the time points t1 and t3 and at each of the completions of the reset operations begun at the time points t1 and t3.

The polarity of the second driving signal is opposite that of the third driving signal.

According to still another aspect of the application, there is provided a semiconductor system including a panel receiving an external input, and a control chip controlling the panel, wherein the control chip includes a logic module supplying a driving signal to the panel, a panel control module reducing noise supplied through the eternal input, and an analog-digital converter (ADC) converting an output signal of the panel control module into a digital signal, wherein the panel control module comprises: an offset canceller cancelling an offset of the driving signal supplied from the panel, a first amplifier reset for each half a cycle of the driving signal and first sampling the noise supplied through the external input through the resetting, the first sampled noise including a noise difference between two consecutive reset points, a sampler alternately performing second sampling and third sampling on the first sampled noise, and a second amplifier receiving the second and third sampled noises and performing buffering and low pass filtering on the second and third sampled noises and supplying the buffered and low-pass-filtered second and third sampled noises to the analog-digital converter (ADC), wherein the first sampled noise includes first to third noise differences, the second sampled noise is a difference between the first and second noise differences, the third sampled noise is a difference between the second and third noise differences, and the fourth sampled noise is a difference between the second and third sampled noises.

BRIEF DESCRIPTION OF THE DRAWINGS

The above and other features and advantages of the application will become more apparent by the following description of the preferred embodiments, with reference to the attached drawings in which.

DETAILED DESCRIPTION OF THE EMBODIMENTS

Figure 1:
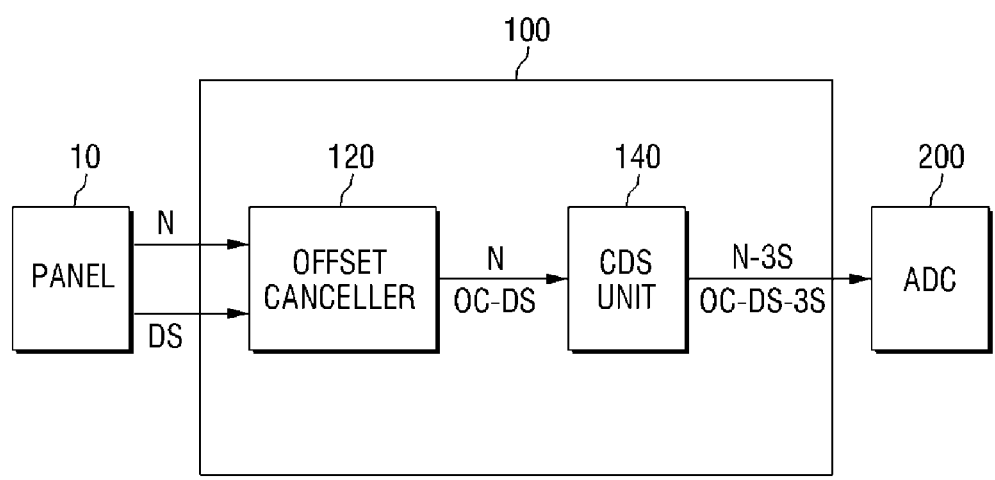
FIG. 1 is a block diagram of a semiconductor device according to an embodiment of the application.

Advantages and features of the technology and methods of accomplishing the same may be understood more readily by reference to the following detailed description of preferred embodiments and the accompanying drawings. The presently disclosed concept may, however, be embodied in many different forms and should not be construed as being limited to the embodiments set forth herein. Rather, these embodiments are provided so that this disclosure will be thorough and complete and will fully convey the concept of the disclosure to those skilled in the art, and the scope of the concept will only be defined by the appended claims. Like reference numerals refer to like elements throughout the specification.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present application.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which the present application belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Figure 2:
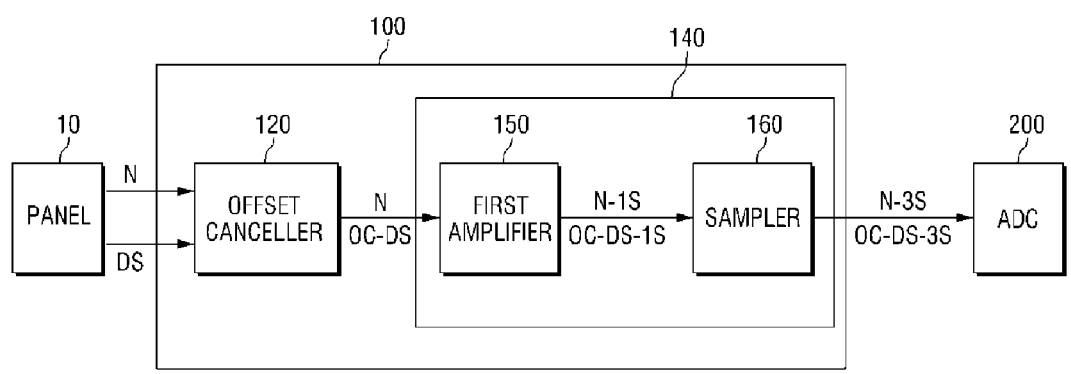
FIG. 2 is a diagram illustrating a correlated double sampler of FIG. 1.
Figure 3:
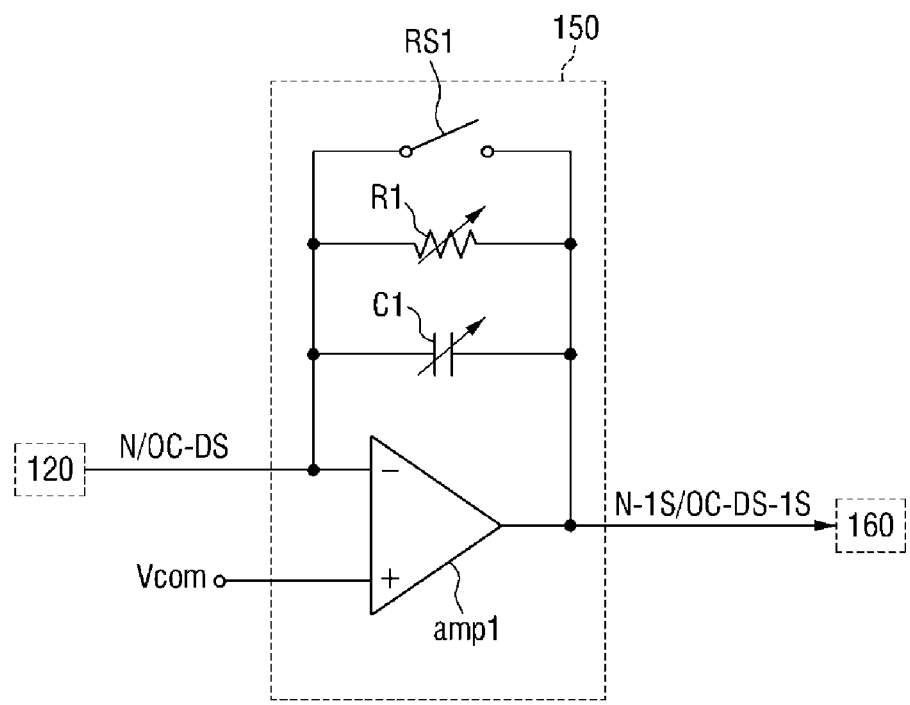
FIG. 3 is a diagram illustrating a first amplifier of FIG. 2.
Figure 4:
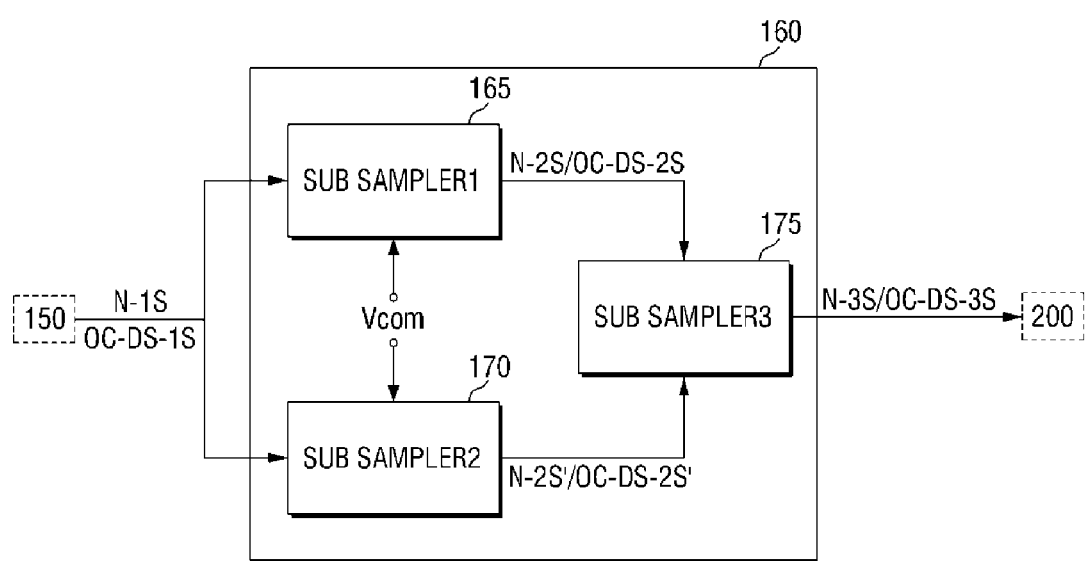
FIGS. 4 and 5 are diagrams illustrating a sampler of FIG. 2
Figure 5:
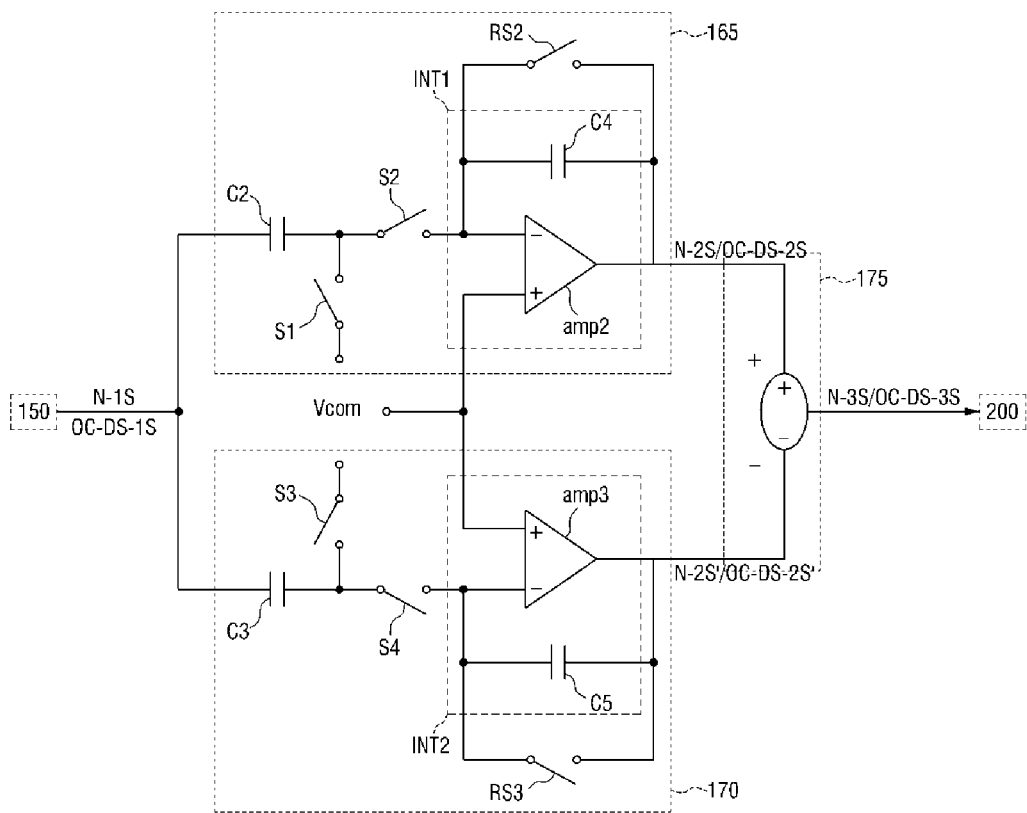

Hereinafter, a semiconductor device according to an embodiment of the application will be described with reference to FIGS. 1 to 5. FIG. 1 is a block diagram of a semiconductor device according to an embodiment of the application. FIG. 2 is a diagram illustrating a correlated double sampler of FIG. 1. FIG. 3 is a diagram illustrating a first amplifier of FIG. 2. FIGS. 4 and 5 are diagrams illustrating a sampler of FIG. 2.

Referring to FIG. 1, the semiconductor device 100 according to an embodiment of the application may include an offset canceller 120 and a correlated double sampling (CDS) unit 140. Here, the semiconductor device 100 may be, for example, a capacitive touch screen controller, but is not limited thereto.

The offset canceller 120 may receive a driving signal DS from a panel 10 and may cancel an offset from the driving signal DS. In detail, the offset canceller 120 may receive the driving signal DS from the panel 10 and may cancel an offset of the driving signal DS, that is, an ambient part. In addition, the offset canceller 120 may supply the offset cancelled driving signal OC-DS to the CDS unit 140. Because the offset canceller 120 cancels the offset of the driving signal DS, the driving signal DS may have a higher gain value, thereby increasing the operating range of the semiconductor device 100. In addition, the offset canceller 120 may receive noise N supplied from the panel 10 through an external input. The offset canceller 120 may supply the noise N received from the panel 10 to the CDS unit 140.

The panel 10 may include, for example, a touch screen panel, specifically a capacitive touch screen panel, but is not limited thereto. In addition, the external input may include, for example, a touch input, specifically a touch input by a user's hand or an input by a stylus pen, but is not limited thereto. The panel 10 may include a mutual capacitance (not shown) formed between a horizontal line and a vertical line provided therein. If there is a change in the capacitance value of the mutual capacitance by a touch input (e.g., a touch by a user's finger), a magnitude of the current applied to a first amplifier (150 of FIG. 2) to later be described may be changed, thereby achieving touch sensing. In addition, when a voltage difference between the panel 10 and a user's finger, for example, is generated by a user's touch, a noise voltage of the user's finger may be supplied to the panel 10 through self-capacitance (not shown).

The CDS unit 140 may receive the noise N and the offset cancelled driving signal OC-DS from the offset canceller 120 and may perform sampling thereon. In detail, the CDS unit 140 may reduce the noise N received from the offset canceller 120 by performing sampling three times and may supply the sampled noise N to an analog-digital converter (ADC) 200. In addition, the CDS unit 140 may increase the offset cancelled driving signal OC-DS supplied from the offset canceller 120 by performing sampling three times and may supply the driving signal DS sampled three times to the ADC 200. The ADC 200 may receive an output of the CDS unit 140 (that is, a sum of the noise N-3S and the driving signal OC-DS-3S, each sampled three times) and may convert the same into a digital signal.

Referring to FIG. 2, the CDS unit 140 may include a first amplifier 150 and a sampler 160. The first amplifier 150 may receive the noise N and the driving signal DS from the panel 10 through the external input and may perform first sampling thereon. In detail, the first amplifier 150 may receive the noise N and the offset cancelled driving signal OC-DS supplied from the offset canceller 120 through an external input, may be reset for a predetermined period of the driving signal DS by a first reset switch (R1 of FIG. 3), and may perform first sampling on the noise N and the offset cancelled driving signal OC-DS based upon a resetting operation. A first sampling of the noise, designated first sampled noise N-1S, may include a noise difference between two consecutive reset points, which will later be described in detail. The first amplifier 150 may perform high pass filtering on the noise N based upon the resetting operation, thereby reducing low-frequency noise and limiting a frequency band width. Accordingly, factors that may limit the design of a circuit, which will later be described, may be reduced.

The first amplifier 150 may include, for example, a charge amplifier, and the predetermined period of the driving signal DS may include, for example, half a cycle of the driving signal DS, but aspects of the application are not limited thereto. In addition, the first amplifier 150 may supply the first sampled noise N-1S and a first sampled driving signal OC-DS-1S to the sampler 160.

The sampler 160 may receive the first sampled noise N-1S and the first sampled driving signal OC-DS-1S from the first amplifier 150 and may alternately perform multiple sampling thereon. In detail, the sampler 160 may receive the first sampled noise N-1S from the first amplifier 150, may alternately perform second sampling and second-prime sampling and may perform third sampling on the second sampled and second-prime sampled noises to generate a third sampled noise N-3S. The noise N may be reduced through multiple sampling. The multiple sampling may include, for example, correlated double sampling (CDS), but aspects of the application are not limited thereto.

In addition, the sampler 160 may receive the first sampled driving signal OC-DS-1S from the first amplifier 150, may alternately perform second sampling and second-prime sampling and may perform third sampling on the second sampled and second-prime sampled driving signals to generate a third sampled driving signal OC-DS-3S.

The driving signal DS may be increased through multiple sampling. The multiple sampling may include, for example, correlated double sampling (CDS), but aspects of the application are not limited thereto The sampler 160 may supply the third sampled noise N-3S and the third sampled driving signal OC-DS-3S to the ADC 200. In this case, the third sampled noise N-3S and the third sampled driving signal OC-DS-3S may be supplied to the ADC 200 in a state in which they are combined with each other.

Referring to FIG. 3, a circuit view of the first amplifier 150 shown in FIG. 2 is illustrated. In detail, the first amplifier 150 may include a first operating amplifier amp1, a first resistor R1, a first capacitor C1 and a first reset switch RS1. The first operating amplifier amp1 may receive the noise N and the offset cancelled driving signal OC-DS from the offset canceller 120 as inverted inputs and may receive a common mode voltage Vcom as a non-inverted input. The first resistor R1 may be connected between an input terminal and an output terminal of the first operating amplifier amp1. In addition, the first capacitor C1 may be connected to the first resistor R1 in parallel and the first reset switch RS1 may be connected to the first capacitor C1 in parallel. With this configuration, the first amplifier 150 may perform high pass filtering on the noise N supplied through the external input using the first resistor R1 and the first capacitor C1.

As described above, the first reset switch RS1 may reset the first amplifier 150 for the predetermined period of the driving signal DS (e.g., half the cycle of the driving signal DS), thereby enabling high pass filtering using the first resistor R1 and the first capacitor C1. The first amplifier 150 may perform not only the high pass filtering through resetting using the first reset switch RS1 but also first sampling (i.e., first CDS).

Referring to FIGS. 4 and 5, the sampler 160 shown in FIG. 2 is illustrated. In detail, the sampler 160 may include a first sub sampler (SUB SAMPLER1) 165 and a second sub sampler (SUB SAMPLER2) 170 performing second sampling (i.e., second CDS) and a third sub sampler (SUB SAMPLER3) 175 performing third sampling (i.e., third CDS).

The first sub sampler 165 may receive the first sampled noise N-1S and the first sampled driving signal OC-DS-1S, may perform second sampling and may supply second sampled noise N-2S and a second sampled driving signal OC-DS-2S to the third sub sampler 175. As illustrated in FIG. 5, the first sub sampler 165 may include a second capacitor C2, a first switch S1, a second switch S2, a first integrator INT1, and a second reset switch RS2. In detail, the second capacitor C2 may be connected between the first amplifier 150 and the second switch S2. The first switch S1 may be connected to the second capacitor C2 and the second switch S2 and may receive the common mode voltage Vcom. The second switch S2 may be connected between the second capacitor C2 and the third sub sampler 175. That is to say, the second switch S2 may be connected between the second capacitor C2 and the first integrator INT1 and may be connected to the first switch S1 and the second reset switch RS2.

The first integrator INT1 may be connected between the second switch S2 and the third sub sampler 175 and may be connected to the second reset switch RS2 in parallel. In addition, the first integrator INT1 may include a second operating amplifier amp2 and a fourth capacitor C4. The fourth capacitor C4 may be connected between an input terminal and an output terminal of the second operating amplifier amp2. In more detail, the fourth capacitor C4 may be connected between an inverted input terminal and the output terminal of the second operating amplifier amp2, and the common mode voltage Vcom may be supplied to a non-inverted input terminal of the second operating amplifier amp2.

The second reset switch RS2 may be connected to the first integrator INT1 in parallel. That is to say, the second reset switch RS2 may be connected to the fourth capacitor C4 in parallel and may reset the first integrator INT1 for every driving period (e.g., the entire cycle rather than one period of the driving signal DS).

The second sub sampler 170 may receive the first sampled noise N-1S and the first sampled driving signal OC-DS-1S, may perform second sampling, and may supply second sampled noise N-2S' and a second sampled driving signal OC-DS-2S' to the third sub sampler 175. In addition, the second sub sampler 170 may include a third capacitor C3, a third switch S3, a fourth switch S4, a second integrator INT2, and a third reset switch RS3. In detail, the third capacitor C3 may be connected to the first amplifier 150. That is to say, the third capacitor C3 may be connected between the first amplifier 150 and the fourth switch S4.

The third switch S3 may be connected to the third capacitor C3 and may receive the common mode voltage Vcom. That is to say, the third switch S3 may be connected to the third capacitor C3 and the fourth switch S4 and may receive the common mode voltage Vcom.

The fourth switch S4 may be connected between the third capacitor C3 and the third sub sampler 175. That is to say, the fourth switch S4 may be connected between the third capacitor C3 and the second integrator INT2 and may also be connected to the third switch S3 and the third reset switch RS3.

The second integrator INT2 may be connected between the fourth switch S4 and the third sub sampler 175. That is to say, the second integrator INT2 may be connected between the fourth switch S4 and the third sub sampler 175 and may be connected to the third reset switch RS3 in parallel. In addition, the second integrator INT2 may include a third operating amplifier amp3 and a fifth capacitor C5, and the fifth capacitor C5 may be connected between an input terminal and an output terminal of the third operating amplifier amp3. In more detail, the fifth capacitor C5 may be connected between an inverted input terminal and the output terminal of the third operating amplifier amp3, and the common mode voltage Vcom may be supplied to a non-inverted input terminal of the third operating amplifier amp3.

The third reset switch RS3 may be connected to the second integrator INT2 in parallel. That is to say, the third reset switch RS3 may be connected to the fifth capacitor C5 in parallel and may reset the second integrator INT2 for every driving period (e.g., the entire cycle rather than one period of the driving signal DS).

The first switch S1 and the fourth switch S4 may be simultaneously turned on or turned off. In addition, the second switch S2 and the third switch S3 may be simultaneously turned on or turned off. Additionally, the first switch S1 and the fourth switch S4 may operate reversely from the second switch S2 and the third switch S3. That is to say, when the first switch S1 and the fourth switch S4 are turned on, the second switch S2 and the third switch S3 may be turned off, and when the first switch S1 and the fourth switch S4 are turned off, the second switch S2 and the third switch S3 may be turned on.

The third sub sampler 175 may receive the second sampled noise N-2S and the second sampled driving signal OC-DS-2S from the first sub sampler 165, may receive the second sampled noise N-2S' and the second sampled driving signal OC-DS-2S' from the second sub sampler 170 and may perform third sampling. In detail, the third sub sampler 175 may receive the second sampled noise N-2S and the second sampled driving signal OC-DS-2S from the first integrator INT1, may receive the second-prime sampled noise N-2S' and the second-prime sampled driving signal OC-DS-2S' from the second integrator INT2, and may perform a subtracting operation to generate third sampled noise N-3S and a third sampled driving signal OC-DS-3S. The third sub sampler 175 may supply a combination signal of the third sampled noise N-3S and the third sampled driving signal OC-DS-3S to the ADC 200.

Figure 6:
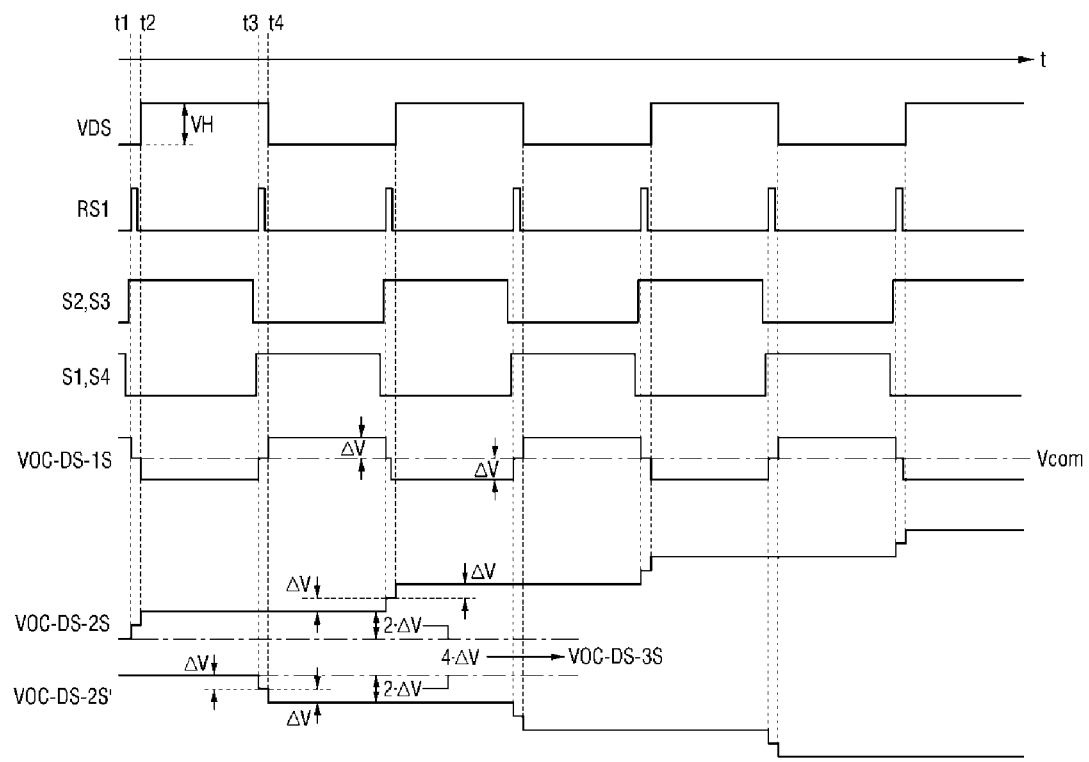
FIG. 6 is a timing diagram illustrating a variation in the output voltage according to the operation of the semiconductor device shown in FIG. 1.
Figure 7:
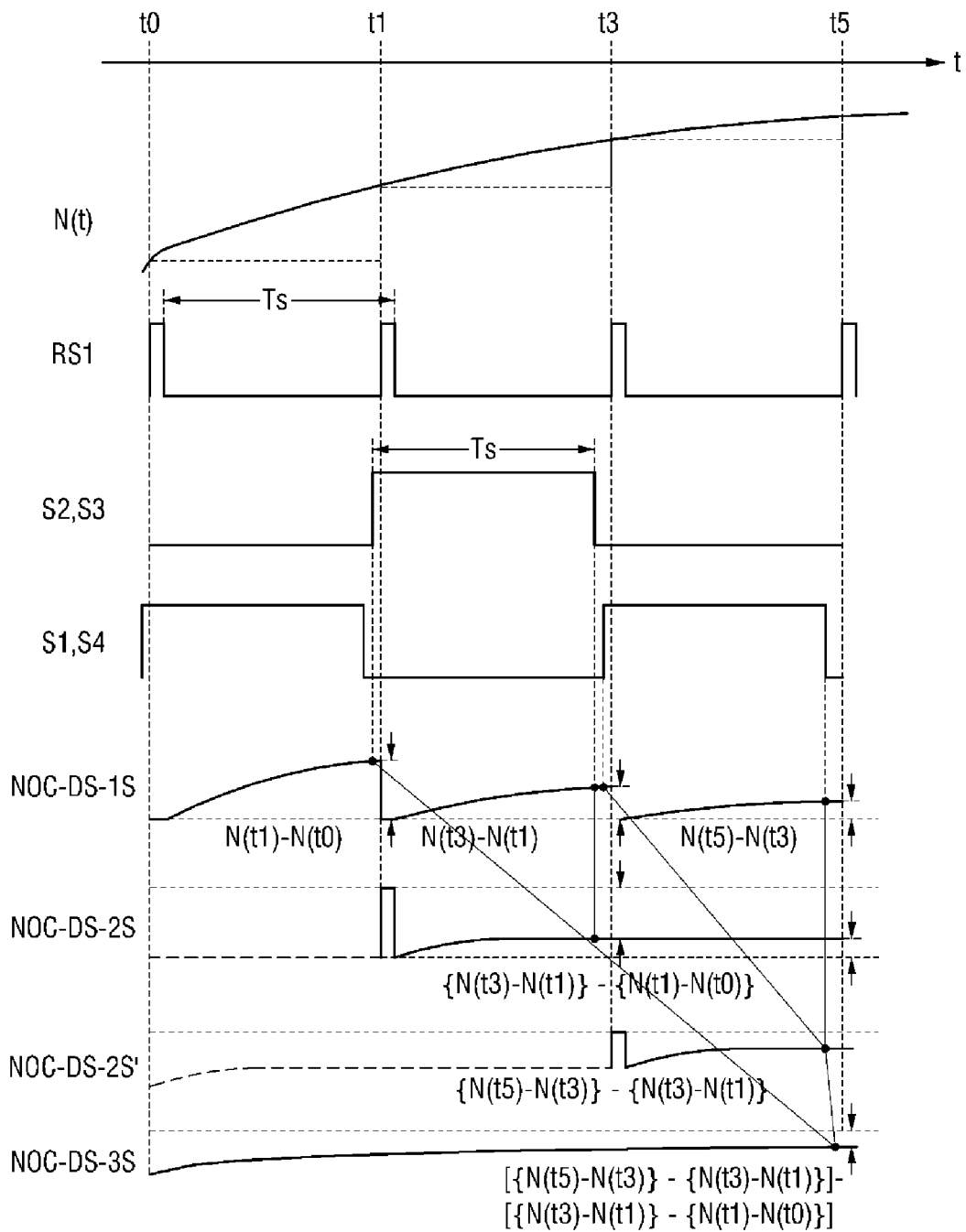
FIG. 7 is a timing diagram illustrating a variation in the noise according to the operation of the semiconductor device shown in FIG. 1.

Hereinafter, variations in the output voltage and noise according to the operation of the semiconductor device shown in FIG. 1 will be described with reference to FIGS. 6 and 7. FIG. 6 is a timing diagram illustrating a variation in the output voltage according to the operation of the semiconductor device shown in FIG. 1, and FIG. 7 is a timing diagram illustrating a variation in the noise according to the operation of the semiconductor device shown in FIG. 1.

Referring to FIGS. 3, 5 and 6, the variation in the output voltage according to the operation of the semiconductor device 100 shown in FIG. 1 is illustrated. In detail, as the second switch S2 and the third switch S3 are turned on (while the first switch S1 and the fourth switch S4 are turned off) at time t1, the second capacitor C2 may be connected to the first integrator INT1. In addition, after the first reset switch RS1 is turned on at time t1, an output voltage VOC-DS-1S of the first amplifier 150 may be changed from a level (common mode voltage Vcom+first voltage variation $\Delta V$) (i.e., Vcom+$\Delta V$) to the common mode voltage Vcom.

Here, the level (Vcom+$\Delta V$) is the output voltage VOC-DS-1S of the first amplifier 150 in the previous cycle (that is, when the first switch S1 and the fourth switch S4 are turned on) and the first voltage variation $\Delta V$ may be determined based on the driving signal DS. In more detail, the first voltage variation $\Delta V$ may be represented by the following relationship: First voltage variation ($\Delta V$)=Driving signal voltage magnitude (VH) when the driving signal DS is in a first state (e.g., high level state)*(Capacitance value of mutual capacitance of panel (10 of FIG. 1)/Capacitance value of first capacitor C1 of first amplifier 150).

In addition, charge stored in the second capacitor C2 (that is, capacitance value of second capacitor C2*first voltage variation $\Delta V$) in the previous cycle (that is, when the first switch S1 and the fourth switch S4 are turned on) is discharged until it reaches 0 V, and the charge having the same amount as that stored in the second capacitor C2 (that is, the charge corresponding to a value (−(capacitance value of second capacitor C2*first voltage variation $\Delta V$)) may be transferred to the fourth capacitor C4 of the first integrator INT1. For brevity, it is assumed that the capacitance value of the fourth capacitor C4 is equal to that of the second capacitor C2. Then, an output voltage VOC-DS-2S of the first sub sampler 165 may also be increased by the first voltage variation $\Delta V$.

After a short reset period of RS1, if the driving signal voltage VDS is changed from a second state 0V to a first state VH at time t2, the output voltage VOC-DS-1S of the first amplifier 150 may be changed from the common mode voltage Vcom to a level (common mode voltage Vcom−first voltage variation $\Delta V$) (i.e., Vcom−$\Delta V$). As the result, charge stored in the second capacitor C2 is changed from 0 to a level (−(capacitance value of second capacitor C2*first voltage variation $\Delta V$)) and negative charge having the same amount as that stored in the second capacitor C2 is transferred to the fourth capacitor C4 of the first integrator INT1. Therefore, the output voltage VOC-DS-2S of the first sub sampler 165 may further be increased by the first voltage variation $\Delta V$.

Accordingly, if the second switch S2 and the third switch S3 are turned on and the first switch S1 and the fourth switch S4 are turned off, the output voltage VOC-DS-2S of the first sub sampler 170 may be increased by the value (2*first voltage variation $\Delta V$). After that, if the second switch S2 and the third switch S3 are turned off, the charge corresponding to a value (−(capacitance value of third capacitor C3*first voltage variation $\Delta V$)) may be stored in the third capacitor C3. Further if the first switch S1 and the fourth switch S4 are turned on and the first reset switch RS1 is turned on at time t3, the charge corresponding to a value (−(capacitance value of third capacitor C3*first voltage variation $\Delta V$)) may be transferred to the fifth capacitor C5 of the second integrator INT2.

Unlike the state that the second switch S2 and the third switch S3 are turned on and the first switch S1 and the fourth switch S4 are turned off, the output voltage VOC-DS-1S of the first amplifier 150 may be increased by the value (2*first voltage variation $\Delta V$) in the state that the second switch S2 and the third switch S3 are turned off and the first switch S1 and the fourth switch S4 are turned on. In addition, the output voltage VOC-DS-2S' may be decreased by the value (2*first voltage variation $\Delta V$). A more detailed explanation follows, below.

As the fourth switch S4 and the first switch S1 are turned on (while the second switch S2 and the third switch S3 are turned off) at time t3, the third capacitor C3 may be connected to the second integrator INT2. In addition, after the first reset switch RS1 is turned on at time t3, the output voltage VOC-DS-1S of the first amplifier 150 may be changed from a level (common mode voltage Vcom−first voltage variation $\Delta V$ (i.e., Vcom−$\Delta V$)) to the common mode voltage Vcom. Here, the level (Vcom−$\Delta V$) is the output voltage output voltage VOC-DS-1S of the first amplifier 150 in the previous cycle (that is, when the second switch S2 and the third switch S3 are turned on). In addition, charge stored in the third capacitor C3 (that is, capacitance value of third capacitor C3*first voltage variation $\Delta V$) in the previous cycle (that is, when the second switch S2 and the third switch S3 are turned on) is discharged until it reaches 0 V and the charge having the same amount as that stored in the third capacitor C3 (that is, the charge corresponding to a value (−(capacitance value of third capacitor C3*first voltage variation $\Delta V$)) may be transferred to the fifth capacitor C5 of the second integrator INT2. For brevity, it is assumed that the capacitance value of the fifth capacitor C5 is equal to that of the third capacitor C3. Then, an output voltage VOC-DS-2S' of the second sub sampler 170 may also be decreased by the first voltage variation $\Delta V$.

After a short reset period, if the driving signal voltage VDS is changed from the first state VH to the second state 0V at time t4, the output voltage VOC-DS-1S of the first amplifier 150 may be changed from the common mode voltage Vcom to a level (common mode voltage Vcom+first voltage variation ΔV) (i.e., Vcom+ΔV). As a result, charges stored in the third capacitor C3 are changed from 0 to a level (−(capacitance value of third capacitor C3*first voltage variation ΔV)), negative charges corresponding thereto are transferred to the fifth capacitor C5 of the second integrator INT2, and positive charges corresponding thereto are again transferred to the fifth capacitor C5 of the second integrator INT2. Therefore, the output voltage VOC-DS-2S' of the second sub sampler 170 may further be decreased by the first voltage variation ΔV. Accordingly, if the first switch S1 and the fourth switch S4 are turned on and the second switch S2 and the third switch S3 are turned off, the output voltage VOC-DS-2S' of the second sub sampler 170 may be decreased by the value (2*first voltage variation ΔV).

That is to say, a variation in the output voltage VOC-DS-2S of the first sub sampler 165 and a variation in the output voltage VOC-DS-2S' of the second sub sampler 170 may be the same with each other in view of magnitude and may be opposite to each other in view of polarity. Therefore, the third sub sampler 175 may receive the output voltage VOC-DS-2S of the first sub sampler 165 and the output voltage VOC-DS-2S' of the second sub sampler 170 and may perform a subtracting operation on the two output voltages. Accordingly, the output voltage VOC-DS-3S of the third sub sampler 175 may be changed by a value (4*first voltage variation ΔV).

Referring to FIGS. 3, 5 and 7, a variation in the noise according to the operation of the semiconductor device shown in FIG. 1 is illustrated. The first amplifier 150 may perform first sampling on the received noise N for every reset period (e.g., half a cycle of the driving signal DS). Here, the first sampled noise N-1S may include a noise difference between two consecutive reset points (e.g., between time t0 and time t1). That is to say, after receiving continuously increasing noise N, the first amplifier 150 may perform first sampling on the noise N by periodically resetting the first reset switch RS1 and the first sampled noise N-1S output by the first amplifier 150 may correspond to variations of the noise N between the two consecutive reset points. That is to say, first CDS performed on the noise N may prevent the output of the first amplifier 150 from being saturated by the noise N supplied through an external input.

Next, it is assumed that the first sampled noise N-1S includes, for example, a first noise difference (N(t1)−N(t0)), a second noise difference (N(t3)−N(t1)), and a third noise difference (N(t5)−N(t3)). Here, t0, t1, t3 and t5 correspond to consecutive reset points of RS1.

First, the first sub sampler 165 is reset at time t1 and starts to operate. That is to say, the first sub sampler 165 may receive the first sampled noise N-1S (that is, the first noise difference (N(t1)−N(t0))) when second and third switches S2 and S3 are turned on and the first sampled noise N-1S (that is, second noise difference (N(t3)−N(t1))) when the second and third switches S2 and S3 are turned off and may perform a subtracting operation. That is to say, the first sub sampler 165 may perform a subtracting operation (second CDS) between the second noise difference (N(t3)−N(t1)) and the first noise difference (N(t1)−N(t0)) to generate a second sampled noise N-2S (that is, {N(t3)−N(t1)}−{(N(t1)−N(t0))}).

Next, the second sub sampler 170 is reset at time t3 and starts to operate. That is to say, the second sub sampler 170 may receive the first sampled noise N-1S (that is, the second noise difference (N(t3)−N(t1))) when first and fourth switches S1 and S4 are turned on and the first sampled noise N-1S (that is, the third noise difference (N(t5)−N(t3))) when first and fourth switches S1 and S4 are turned off and may perform a subtracting operation. That is to say, the first sub sampler 165 may perform a subtracting operation (second CDS) between the third noise difference (N(t5)−N(t3)) and the second noise difference (N(t3)−N(t1)) to generate a second-prime sampled noise N-2S' (that is, {N(t5)−N(t3)}−{(N(t3)−N(t0))}).

Next, the third sub sampler 175 may receive the second sampled noise N-2S (that is, {N(t3)−N(t1)}−{(N(t1)−N(t0))}) from the first sub sampler 165 and the second-prime sampled noise N-2S' (that is, {N(t5)−N(t3)}−{(N(t3)−N(t0))}) from the second sub sampler 170 and may perform third sampling. That is to say, the third sub sampler 175 may perform a subtracting operation (third CDS) between the second sampled noise N-2S (that is, {N(t3)−N(t1)}−{(N(t1)−N(t0))}) and the second-prime sampled noise N-2S' (that is, {N(t5)−N(t3)}−{(N(t3)−N(t0))}) to generate a third sampled noise N-3S (that is, [{N(t5)−N(t3)}−{(N(t3)−N(t0))}]−[{N(t3)−N(t1)}−{(N(t1)−N(t0))}]). As shown in FIG. 7, the noise N is gradually decreased through sampling performed three times (that is, CDS).

The semiconductor device 100 according to an embodiment of the application can reduce not only low-frequency noise but also the noise N supplied through the external input through CDS performed three times and can amplify the driving signal DS. In addition, the semiconductor device 100 may cancel the offset of the driving signal DS using the offset canceller 120 to allow the driving signal DS to have a higher gain value, thereby increasing the operating range of the semiconductor device 100.

Hereinafter, a semiconductor device 300 according to another embodiment of the application will be described with reference to FIGS. 8 to 11. The following description will focus on differences between the present and previous embodiments.

Figure 8:
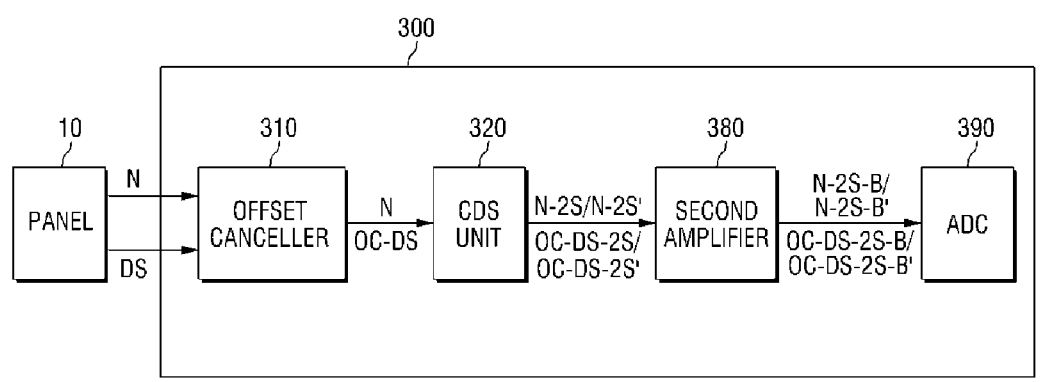
FIG. 8 is a block diagram of a semiconductor device according to another embodiment of the application.
Figure 9:
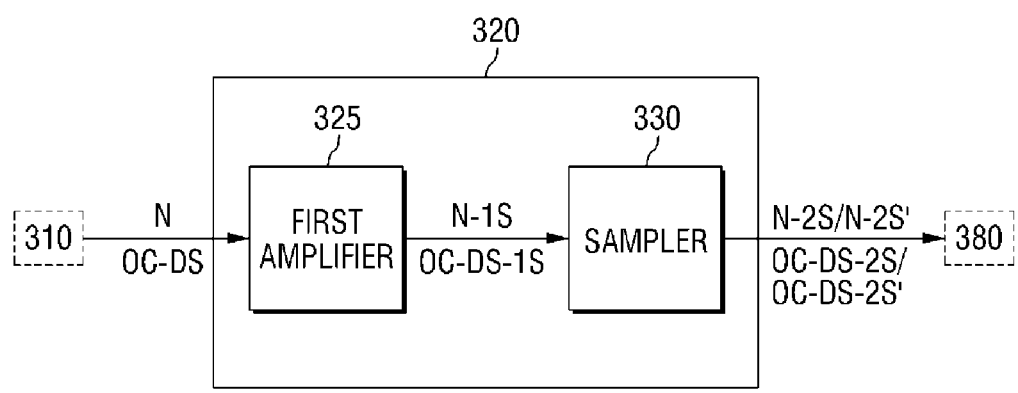
FIG. 9 is a diagram illustrating a correlated double sampler of FIG. 8.
Figure 10:
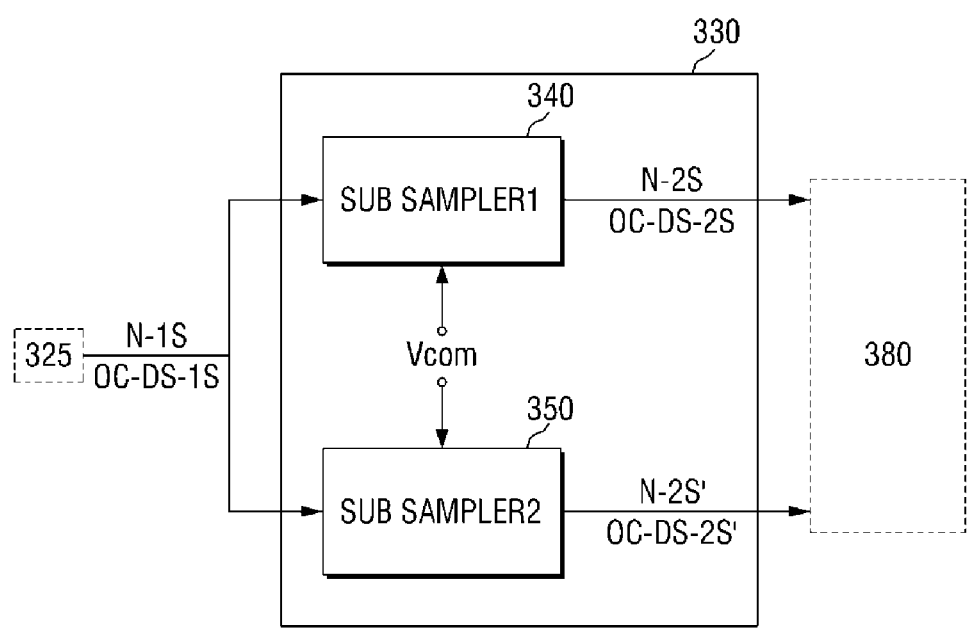
FIG. 10 is a diagram illustrating a sampler of FIG. 9.
Figure 11:
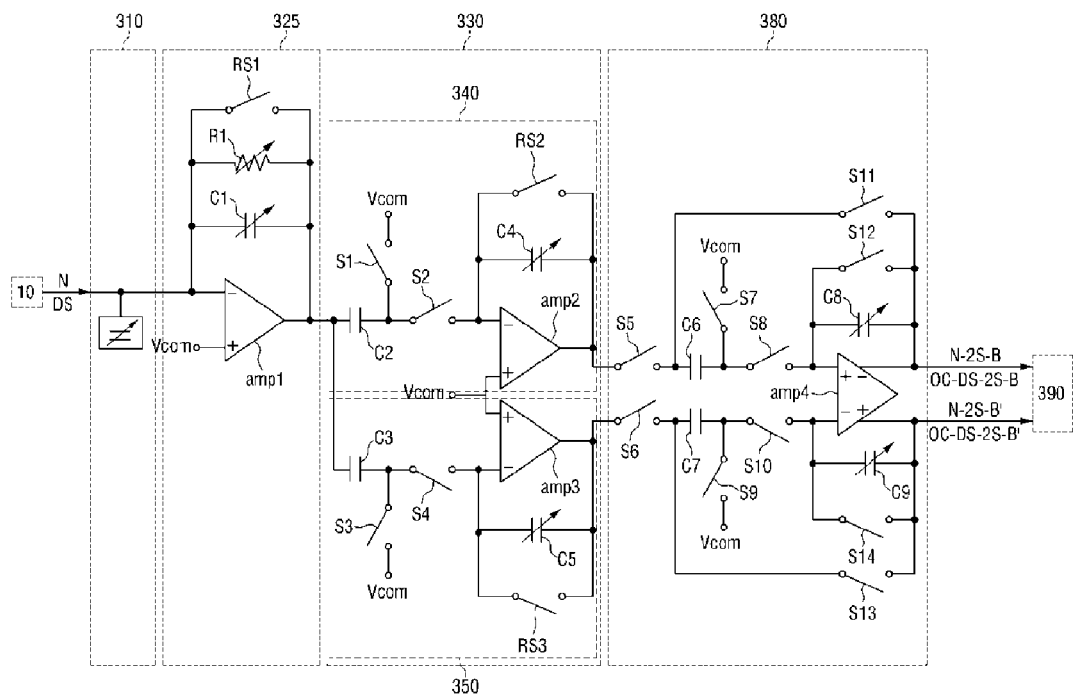
FIG. 11 is a diagram illustrating an offset canceller, a correlated double sampler and a second amplifier of FIG. 8.

FIG. 8 is a block diagram of a semiconductor device according to another embodiment of the application. FIG. 9 is a diagram illustrating a correlated double sampler of FIG. 8. FIG. 10 is a diagram illustrating a sampler of FIG. 9. FIG. 11 is a diagram illustrating an offset canceller, a correlated double sampler, and a second amplifier of FIG. 8.

Referring to FIG. 8, the semiconductor device 300 according to another embodiment of the application may include an offset canceller 310, a correlated double sampling (CDS) unit 320, a second amplifier 380, and an analog-digital converter (ADC) 390. The offset canceller 310 may perform the same function as the offset canceller 120 shown in FIG. 1, and a detailed description thereof will not be given.

The CDS unit 320 may receive noise N and an offset cancelled driving signal OS-DS from the offset canceller 310 and may perform sampling. In detail, the CDS unit 320 may reduce the noise N received from the offset canceller 310 through sampling performed twice and may provide twice-sampled noises N-2S and N-2S' to the second amplifier 380. In addition, the CDS unit 320 may increase the offset cancelled driving signal OS-DS received from the offset canceller 310 through sampling performed twice and may provide twice-sampled driving signals OC-DS-2S and OC-DS-2S' to the second amplifier 380.

The second amplifier 380 may receive the twice-sampled noises N-2S and N-2S' and the twice-sampled driving signals OC-DS-2S and OC-DS-2S' and may perform buffering and low pass filtering. In addition, the second amplifier 380 may provide the buffered and low-pass-filtered twice-sampled noises N-2S and N-2S' and the buffered and low-pass-filtered twice-sampled driving signals OC-DS-2S and OC-DS-2S' to the ADS 390.

The second amplifier 380 may include, for example, a sample and hold amplifier, but aspects of the application are not limited thereto. The ADS 390 may perform third sampling on the buffered and low-pass-filtered twice-sampled noises N-2S and N-2S' and the buffered and low-pass-filtered twice-sampled driving signals OC-DS-2S and OC-DS-2S'. In detail, the ADS 390 may receive the buffered and low-pass-filtered twice-sampled noises N-2S and N-2S' and the buffered and low-pass-filtered twice-sampled driving signals OC-DS-2S and OC-DS-2S' from the second amplifier 380 to perform third sampling and may convert a sum of the third sampled noise and driving signal into a digital signal. The third sampled noise may be a difference between the twice-sampled noises N-2S and N-2S' and the third sampled driving signal may be a difference between the twice-sampled driving signals OC-DS-2S and OC-DS-2S'.

Referring to FIG. 9, the CDS unit 320 may include a first amplifier 325 and a sampler 330. The first amplifier 325 may perform the same function as the first amplifier 150 shown in FIG. 2, and a detailed description thereof will not be given.

The sampler 330 may receive the first sampled noise N-1S and the first sampled driving signal OC-DS-1S from the first amplifier 325 and may alternately perform multiple sampling. In detail, the sampler 330 may receive the first sampled noise N-1S from the first amplifier 325, may alternately perform second sampling and second-prime sampling, and may provide second and second-prime sampled noises N-2S and N-2S' to the second amplifier 380. In addition, the sampler 330 may receive the first sampled driving signal OC-DS-1S from the first amplifier 325, alternately perform second sampling and second-prime sampling, and may provide second and second-prime sampled driving signals OC-DS-2S and OC-DS-2S' to the second amplifier 380.

Referring to FIG. 10, the sampler 330 may include a first sub sampler (SUB SAMPLER1) 340 and a second sub sampler (SUB SAMPLER2) 350. Here, the sampler 330 may not include a third sub sampler (175 of FIG. 4), unlike the sampler 160 of FIG. 4. The first sub sampler 340 and the second sub sampler 350 may perform substantially the same functions as the first sub sampler 340 and the second sub sampler 350 shown in FIG. 4, respectively, except that the respective outputs, that is, the second sampled noise N-2S and the second sampled driving signal OC-DS-2S and the second-prime sampled noise N-2S' and the second-prime sampled driving signal OC-DS-2S' are provided to the second amplifier 380.

Referring to FIG. 11, circuit views of the offset canceller 310, the first amplifier 325, the sampler 330, and the second amplifier 380 are illustrated. Unlike in the semiconductor device 100 according to the previous embodiment, since the second amplifier 380 is additionally provided between the sampler 330 and the ADS 390, an output terminal of the first sub sampler 340 and an output terminal of the second sub sampler 350 are separated from each other to then be connected to the second amplifier 380. In addition, since the second amplifier 380 has a differential structure, buffering and low pass filtering may be separately performed on the second sampled noise N-2S and the second sampled driving signal OC-DS-2S received from the first sub sampler 340 and the second-prime sampled noise N-2S' and the second-prime sampled driving signal OC-DS-2S' received from the second sub sampler 350.

The second amplifier 380 may include an amplifier amp4 having differential inputs and differential outputs. A variable capacitor C8 and a switch S11 are each connected between a negative output terminal and positive input terminal of amplifier amp4. A variable capacitor C9 and a switch S14 are each connected between a positive output terminal and negative input terminal of amplifier amp4. A switch S5 has a first terminal connected to the output of amplifier amp2 of first sub sampler 340, and a switch S6 has a first terminal connected to the output of amplifier amp3 of first sub sampler 340. A switch S11 has a first terminal connected to a second terminal of switch S5 and a second terminal connected to the negative output terminal of amplifier amp4. Similarly, a switch S13 has a first terminal connected to a second terminal of switch S6 and a second terminal connected to the positive output terminal of amplifier amp4.

A capacitor C6 has a first terminal connected to the second terminal of switch S5 and the first terminal of switch s11. A second terminal of capacitor C6 is connected to first terminals of each of switches S7 and S8. A second terminal of switch S7 is connect to the common mode voltage Vcom. A second terminal of switch S8 is connected to the positive input of amplifier amp4.

A capacitor C7 has a first terminal connected to the second terminal of switch S6 and the first terminal of switch s13. A second terminal of capacitor C7 is connected to first terminals of each of switches S9 and S10. A second terminal of switch S9 is connect to the common mode voltage Vcom. A second terminal of switch S10 is connected to the negative input of amplifier amp4.

Operation of amplifier 380 is similar to that of sub sampler 1 and 2, as would be recognized by those skilled in the art, and a detailed description of the operation is therefore omitted.

The semiconductor device 300 can reduce not only low-frequency noise but also the noise N supplied through the external input through CDS performed three times and can amplify the driving signal DS. In addition, unlike the semiconductor device 100, the semiconductor device 300 includes the second amplifier 380 (that is, the sample and hold amplifier), thereby additionally performing buffering and low pass filtering and further improving immunity against noises. Additionally, the semiconductor device 300 may cancel the offset of the driving signal DS using the offset canceller 120 to allow the driving signal DS to have a higher gain value, thereby increasing the operating range of the semiconductor device 300.

Hereinafter, a semiconductor system according to an embodiment of the application will be described with reference to FIG. 12. The following description will focus on differences between the present and previous embodiments.

Figure 12:
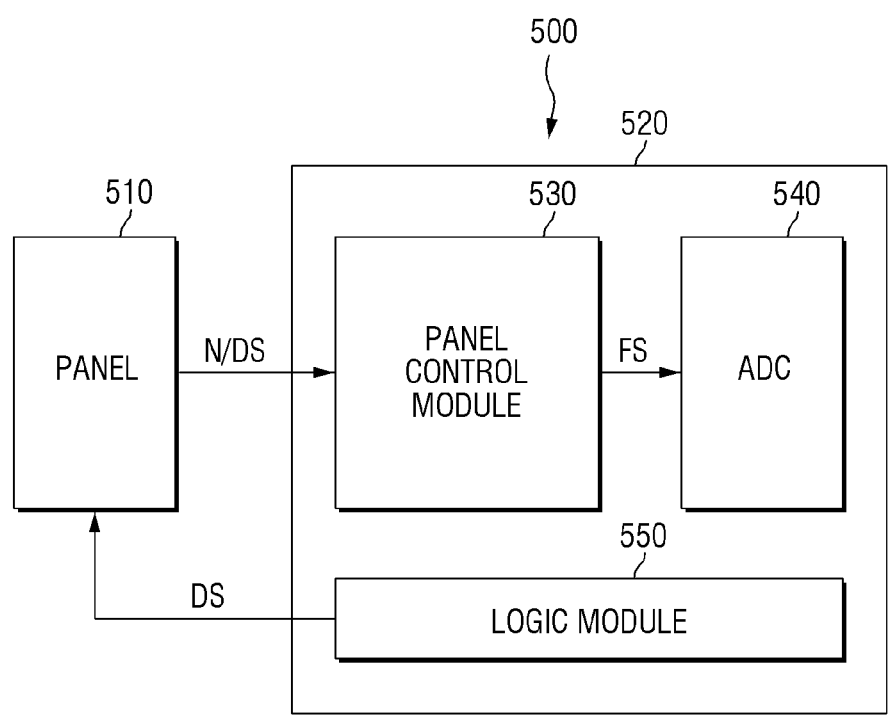
FIG. 12 is a block diagram of a semiconductor system according to another embodiment of the application.

FIG. 12 is a block diagram of a semiconductor system according to another embodiment of the application. Referring to FIG. 12, a semiconductor system 500 according to another embodiment of the application may include a panel 510 and a control chip 520.

In detail, the panel 510 may receive an external input. And the panel 510 may receive a driving signal DS from a logic module 550 of a control chip 520. The panel 10 may include, for example, a touch screen panel, specifically, a capacitive touch screen panel, but is not limited thereto. In addition, the external input may include, for example, a touch input, specifically a touch input by a user's hand or an input by a stylus pen, but is not limited thereto.

The control chip 520 may include a logic module 550 supplying a driving signal DS to the panel 510, a panel control module 530 reducing a noise supplied through an external input, and an analog-digital converter (ADC) 540 converting an output signal FS of the panel control module 530 into a digital signal. The logic module 550 may include, for example, an offset table, a flash memory, an interface logic, and a micro controller unit (MCU). In addition, the panel control module 530 may include corresponding components having the same configurations as the offset canceller 310, the CDS unit 320, and the second amplifier 380 shown in FIG. 8, respectively.

The ADC 540 may perform third sampling on output signals (FS) of the panel control module 530 (that is, second and second-prime sampled noises and driving signals) and may convert the third sampled output signal into a digital signal. That is to say, the ADC 540 may perform the same function as the ADS 390 shown in FIG. 8.

Figure 13:
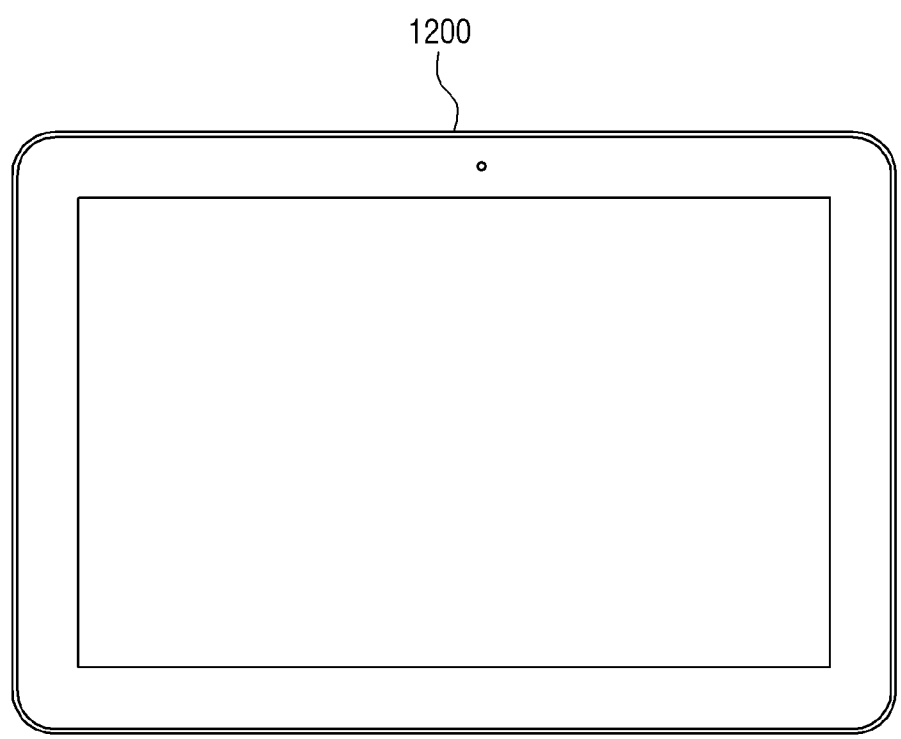
FIGS. 13 to 15 illustrate exemplary electronic systems to which semiconductor devices according to some embodiments of the application can be applied.
Figure 14:
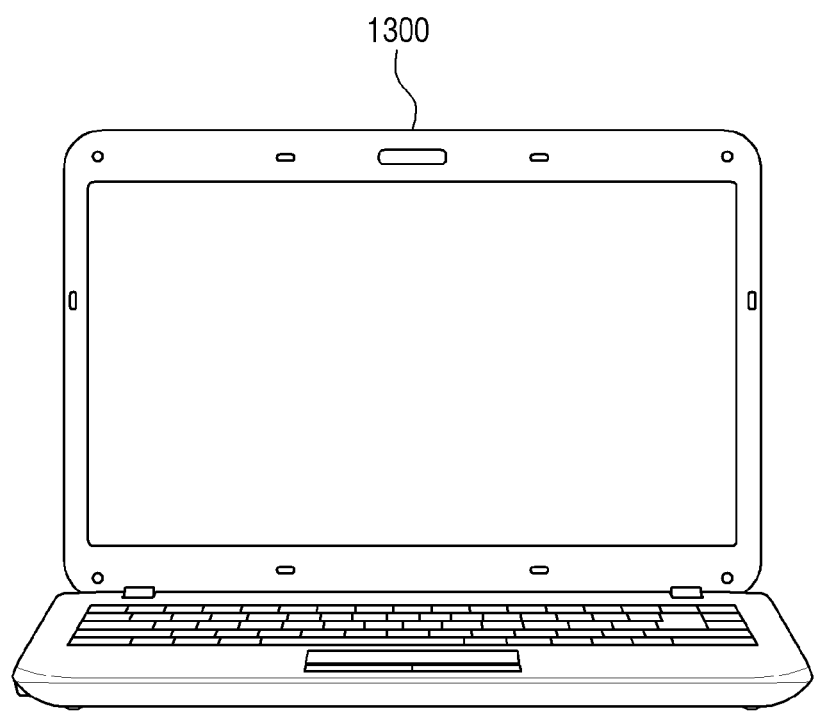
Figure 15:
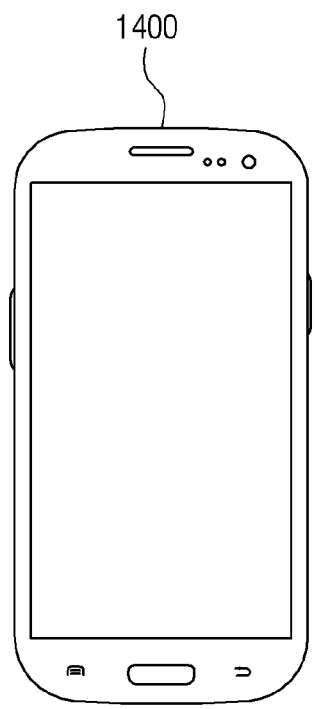

FIGS. 13 to 15 illustrate exemplary semiconductor systems to which semiconductor devices according to some embodiments of the application can be applied. FIG. 13 illustrates an example in which a semiconductor device according to an embodiment of the application is applied to a tablet PC 1200. FIG. 14 illustrates an example in which a semiconductor device according to an embodiment of the application is applied to a notebook computer 1300. FIG. 15 illustrates an example in which a semiconductor device according to an embodiment of the application is applied to a smart phone 1400. At least one of the semiconductor devices 100 and 300 according to some embodiments of the application can be employed by tablet PC 1200, notebook computer 1300, smart phone 1400, and the like.

In addition, it is obvious to one skilled in the art that the semiconductor devices 100 and 300 according to some embodiments of the application may also be applied to other IC devices not illustrated herein. That is to say, in the above-described embodiments, only the tablet PC 1200, the notebook computer 1300 and the smart phone 1400 have been exemplified as the semiconductor devices according to the embodiments of the application, but aspects of the application are not limited thereto. In some embodiments of the application, the semiconductor device may be implemented as a computer, an ultra mobile personal computer (UMPC), a work station, a net-book, a personal digital assistant (PDA), a portable computer, a web tablet, a wireless phone, a mobile phone, a smart phone, an e-book, a portable multimedia player (PMP), a potable game console, a navigation device, a black box, a digital camera, a 3-dimensional (3D) television, a digital audio recorder, a digital audio player, a digital picture recorder, a digital picture player, a digital video recorder, a digital video player, or the like.

While the application has been particularly shown and described with reference to exemplary embodiments thereof, it will be understood by those of ordinary skill in the art that various changes in form and details may be made therein without departing from the spirit and scope of the application as defined by the following claims. It is therefore desired that the present embodiments be considered in all respects as illustrative and not restrictive, reference being made to the appended claims rather than the foregoing description to indicate the scope of the application.

What is claimed is:

1. A semiconductor device comprising:
an amplifier that receives input signal and a driving signal, resets for each predetermined period of the driving signal and samples the input signal to generate first sampled input signal, wherein the first sampled input signal includes first to third input signal differences of the input signal each corresponding to variation of the input signal between a different pair of consecutive reset points; and
a sampler that performs second sampling and third sampling on the first sampled input signal to generate second and third sampled input signals, respectively, and performs fourth sampling on the second and third sampled input signals to generate fourth sampled input signal, wherein:
the second sampled input signal is a difference between the first and second input signal differences,
the third sampled input signal is a difference between the second and third input signal differences, and
the fourth sampled input signal is a difference between the second and third sampled input signals.

2. The semiconductor device of claim 1, wherein the amplifier comprises:
a first operating amplifier;
a first resistor connected between an input terminal and an output terminal of the first operating amplifier;
a first capacitor connected in electrical parallel with the first resistor; and
a first reset switch connected in electrical parallel with the first capacitor.

3. The semiconductor device of claim 2, wherein the input signal is high-pass filtered through the first resistor and the first capacitor.

4. The semiconductor device of claim 1, wherein the predetermined period of the driving signal is half a cycle of the driving signal.

5. The semiconductor device of claim 1, further comprising an offset canceller that receives the driving signal and cancels an offset of the driving signal.

6. The semiconductor device of claim 5, wherein the amplifier receives the input signal and the offset-cancelled driving signal.

7. The semiconductor device of claim 1, wherein the sampler comprises:
a first sub-sampler that performs the second sampling;
a second sub-sampler that performs the third sampling; and
a third sub-sampler that performs the fourth sampling.

8. The semiconductor device of claim 7, wherein the first sub-sampler comprises:
a first capacitor connected to the amplifier;
a first switch that is connected to the first capacitor and receives a common-mode voltage;
a second switch connected between the first capacitor and the third sub-sampler;
a first integrator connected between the second switch and the third sub-sampler; and
a first reset switch connected in electrical parallel with the first integrator.

9. The semiconductor device of claim 8, wherein the second sub-sampler comprises:
a second capacitor connected to the amplifier;
a third switch that is connected to the second capacitor and receives the common-mode voltage;
a fourth switch connected between the second capacitor and the third sub-sampler;
a second integrator connected between the fourth switch and the third sub-sampler; and
a second reset switch connected in electrical parallel with the second integrator.

10. The semiconductor device of claim 9, wherein the third sub-sampler receives outputs of the first and second integrators and performs a subtracting operation.

11. The semiconductor device of claim 9, wherein the first switch and the fourth switch are simultaneously turned on or turned off.

12. The semiconductor device of claim 1, wherein:
the amplifier includes a first operating amplifier that receives a common-mode voltage,
the sampler comprises a first sub-sampler that performs the second sampling, a second sub-sampler that performs the third sampling, a third sub-sampler that performs the fourth sampling, and
the first sub-sampler comprises a capacitor connected to the amplifier, a switch connected between the capacitor and the third sub-sampler, and an integrator connected between the switch and the third sub-sampler.

13. A semiconductor device comprising:
an offset canceller that receives noise and a driving signal and cancels an offset of the driving signal;
a correlated double-sampling (CDS) unit that reduces the noise through sampling; and
a sample-and-hold amplifier that receives an output of the CDS unit and performs buffering and low-pass filtering, wherein:
the CDS unit resets for each predetermined period of the offset-cancelled driving signal, samples the noise to generate first sampled noise, performs second sampling and third sampling on the first sampled noise to generate second and third sampled noise, respectively, and supplies the second and third sampled noises to the sample-and-hold amplifier,
the first sampled noise includes a noise difference between two consecutive reset points and includes first to third noise differences,
the second sampled noise is a difference between the first and second noise differences, and
the third sampled noise is a difference between the second and third noise differences.

14. The semiconductor device of claim 13, wherein the sample-and-hold amplifier performs buffering and low-pass filtering on the second and third sampled noises.

15. The semiconductor device of claim 14, further comprising:
an analog-digital converter (ADC) that performs fourth sampling of the buffered and low-pass-filtered second and third sampled noises, wherein
the fourth sampled noise is a difference between the second and third sampled noises.

16. A semiconductor device comprising:
a first sampler that samples received noise at four consecutive points in time to generate sampled noise, wherein the points in time are t0, t1, t2, and t3 and occur in the sequence t0, t1, t2, and t3;
a second sampler that samples the sampled noise to generate a first signal indicating the difference in the amount of noise existing in the sampled noise between time points t1 and t0, generates a second signal indicating the difference in the amount of noise existing in the sampled noise between time points t2 and t1, and generates a third signal indicating the difference in the amount of noise between the second signal and the first signal;
a third sampler that samples the sampled noise to generate a fourth signal indicating the difference in the amount of noise existing in the sampled noise between time points t2 and t0, generates a fifth signal indicating the difference in the amount of noise existing in the sampled noise between time points t3 and t2, and generates a sixth signal indicating the difference in the amount of noise between the fifth signal and the fourth signal; and
a summer that generates a difference in the amount of noise indicated by the third and sixth signals.

17. The semiconductor device of claim 16, wherein:
the first sampler further receives a cyclic driving signal and a common-mode voltage signal and generates a first driving signal that is proportional to a difference between the driving signal and the common-mode signal except during cyclic reset operations in which the common-mode signal is output as the first driving signal,
the cyclic reset operation has a cyclic period that is less than that of the cyclic driving signal, and
a different one of the cyclic reset operations begins at each of the time points t0, t1, t2, and t3.

18. The semiconductor device of claim 17, wherein the second sampler receives the first driving signal, amplifies the first driving signal, and generates a second driving signal whose magnitude increases in proportion to the difference between the first driving signal and the common-mode signal at each of the beginnings of the time points t0 and t2 and at each of the completions of the reset operations begun at the time points t0 and t2.

19. The semiconductor device of claim 18, wherein the third sampler receives the first driving signal, amplifies the first driving signal, and generates a third driving signal whose magnitude increases in proportion to the difference between the first driving signal and the common-mode signal at each of the beginnings of the time points t1 and t3 and at each of the completions of the reset operations begun at the time points t1 and t3.

20. The semiconductor device of claim 19, wherein the polarity of the second driving signal is opposite that of the third driving signal.

* * * * *